United States Patent
Danner et al.

(10) Patent No.: US 8,390,301 B2
(45) Date of Patent: Mar. 5, 2013

(54) ELECTRO-OPTIC DISPLAYS, AND MATERIALS AND METHODS FOR PRODUCTION THEREOF

(75) Inventors: Guy M. Danner, Somerville, MA (US); Jonathan D. Albert, Philadelphia, PA (US); Valerie C. Northrop, Waltham, MA (US); Timothy L. Wong, Brighton, MA (US)

(73) Assignee: E Ink Corporation, Cambridge, MA (US)

( * ) Notice: Subject to any disclaimer, the term of this patent is extended or adjusted under 35 U.S.C. 154(b) by 947 days.

(21) Appl. No.: 12/146,112

(22) Filed: Jun. 25, 2008

(65) Prior Publication Data

US 2008/0309350 A1 Dec. 18, 2008

Related U.S. Application Data

(63) Continuation-in-part of application No. 11/682,409, filed on Mar. 6, 2007, now Pat. No. 7,733,554.

(60) Provisional application No. 60/946,997, filed on Jun. 29, 2007, provisional application No. 60/947,001, filed on Jun. 29, 2007, provisional application No. 60/767,171, filed on Mar. 8, 2006.

(51) Int. Cl.
*G01R 31/02* (2006.01)
*G01R 23/17* (2006.01)
*G02B 26/00* (2006.01)

(52) U.S. Cl. ...................... 324/537; 324/76.36; 359/296

(58) Field of Classification Search ............... 324/76.36, 324/754.23, 537; 359/296
See application file for complete search history.

(56) References Cited

U.S. PATENT DOCUMENTS

| | | | |
|---|---|---|---|
| 2,172,870 A * | 9/1939 | Fulk | .................................. 462/2 |
| 3,668,106 A | 6/1972 | Ota | |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 4,418,346 A | 11/1983 | Batchelder | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |

(Continued)

FOREIGN PATENT DOCUMENTS

| | | |
|---|---|---|
| EP | 1 099 207 B1 | 3/2002 |
| EP | 1 145 072 B1 | 5/2003 |

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — Amy He
(74) *Attorney, Agent, or Firm* — David J. Cole

(57) ABSTRACT

A sub-assembly useful in an electro-optic display includes a conductive layer and a layer of electro-optic medium. The conductive layer has a main section covered by the electro-optic medium, an exposed section free from the electro-optic medium, and a weak section connecting the main section and the exposed section, so that the exposed section can be manipulated to rupture the weak section, thus separating the exposed section from the main section without substantial damage.

13 Claims, 8 Drawing Sheets

U.S. PATENT DOCUMENTS

| | | |
|---|---|---|
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,636,186 B1 | 10/2003 | Yamaguchi et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,844,673 B1 | 1/2005 | Bernkopf |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,339,715 B2 | 3/2008 | Webber et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |

| | | |
|---|---|---|
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,442,587 B2 | 10/2008 | Amundson et al. |
| 7,443,571 B2 | 10/2008 | LeCain et al. |
| 7,453,445 B2 | 11/2008 | Amundson |
| 7,492,339 B2 | 2/2009 | Amundson |
| 7,492,497 B2 | 2/2009 | Paolini, Jr. et al. |
| 7,513,813 B2 | 4/2009 | Paolini, Jr. et al. |
| 7,528,822 B2 | 5/2009 | Amundson et al. |
| 7,532,388 B2 | 5/2009 | Whitesides et al. |
| 7,535,624 B2 | 5/2009 | Amundson et al. |
| 7,545,358 B2 | 6/2009 | Gates et al. |
| 7,551,346 B2 | 6/2009 | Fazel et al. |
| 7,554,712 B2 | 6/2009 | Patry et al. |
| 7,561,324 B2 | 7/2009 | Duthaler et al. |
| 7,583,251 B2 | 9/2009 | Arango et al. |
| 7,583,427 B2 | 9/2009 | Danner et al. |
| 7,598,173 B2 | 10/2009 | Ritenour et al. |
| 7,602,374 B2 | 10/2009 | Zehner et al. |
| 7,649,666 B2 | 1/2010 | Isobe et al. |
| 7,667,886 B2 | 2/2010 | Danner et al. |
| 7,672,040 B2 | 3/2010 | Sohn et al. |
| 7,688,497 B2 | 3/2010 | Danner et al. |
| 7,729,039 B2 | 6/2010 | LeCain et al. |
| 7,746,544 B2 | 6/2010 | Comiskey et al. |
| 7,791,789 B2 | 9/2010 | Albert et al. |
| 7,826,129 B2 | 11/2010 | Wu et al. |
| 7,843,624 B2 | 11/2010 | Danner et al. |
| 7,848,006 B2 | 12/2010 | Wilcox et al. |
| 7,903,319 B2 | 3/2011 | Honeyman et al. |
| 7,910,175 B2 | 3/2011 | Webber et al. |
| 7,952,790 B2 | 5/2011 | Honeyman et al. |
| 7,956,841 B2 | 6/2011 | Albert et al. |
| 8,018,640 B2 | 9/2011 | Whitesides et al. |
| 8,077,141 B2 | 12/2011 | Duthaler et al. |
| 8,089,453 B2 | 1/2012 | Comiskey et al. |
| 8,125,501 B2 | 2/2012 | Amundson et al. |
| 2001/0045934 A1 | 11/2001 | Turner et al. |
| 2002/0060321 A1 | 5/2002 | Kazlas et al. |
| 2002/0090980 A1 | 7/2002 | Wilcox et al. |
| 2003/0102858 A1 | 6/2003 | Jacobson et al. |
| 2004/0027327 A1 | 2/2004 | LeCain et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0105159 A1* | 5/2005 | Paolini et al. ............ 359/252 |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amundson et al. |
| 2007/0035808 A1 | 2/2007 | Amundson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200795 A1 | 8/2007 | Whitesides et al. |
| 2007/0211002 A1 | 9/2007 | Zehner et al. |
| 2007/0247697 A1 | 10/2007 | Sohn et al. |
| 2007/0285385 A1 | 12/2007 | Albert et al. |
| 2007/0286975 A1 | 12/2007 | Fazel et al. |
| 2008/0013156 A1 | 1/2008 | Whitesides et al. |
| 2008/0024429 A1 | 1/2008 | Zehner |
| 2008/0024482 A1 | 1/2008 | Gates et al. |
| 2008/0030832 A1 | 2/2008 | Paolini, Jr. et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0074730 A1 | 3/2008 | Cao et al. |
| 2008/0117495 A1 | 5/2008 | Arango et al. |
| 2008/0129667 A1 | 6/2008 | Zehner et al. |
| 2008/0130092 A1 | 6/2008 | Whitesides et al. |
| 2008/0136774 A1 | 6/2008 | Harris et al. |
| 2008/0137176 A1 | 6/2008 | Isobe et al. |
| 2008/0150888 A1 | 6/2008 | Albert et al. |
| 2008/0174853 A1 | 7/2008 | Danner et al. |
| 2008/0218839 A1 | 9/2008 | Paolini, Jr. et al. |
| 2008/0266245 A1 | 10/2008 | Wilcox et al. |
| 2008/0273132 A1 | 11/2008 | Hsu et al. |
| 2008/0291129 A1 | 11/2008 | Harris et al. |
| 2008/0299859 A1 | 12/2008 | Paolini, Jr. et al. |
| 2008/0309350 A1 | 12/2008 | Danner et al. |

FOREIGN PATENT DOCUMENTS

| | | |
|---|---|---|
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater., 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

ELECTRO-OPTIC DISPLAYS, AND MATERIALS AND METHODS FOR PRODUCTION THEREOF

REFERENCE TO RELATED APPLICATIONS

This application claims benefit of Provisional Applications Nos. 60/946,997 and 60/947,001, both filed Jun. 29, 2007. This application is also a continuation-in-part of application Ser. No. 11/682,409, filed Mar. 6, 2007 (Publication No. 2007/0211331, now U.S. Pat. No. 7,733,554), which itself claims benefit of Provisional Application No. 60/767,171, filed Mar. 8, 2006.

This application is also related to:

(a) U.S. Pat. No. 6,982,178;

(b) application Ser. No. 10/605,024, filed Sep. 2, 2003 (Publication No. 2004/0155857, now U.S. Pat. No. 7,561,324);

(c) U.S. Pat. No. 7,110,164;

(d) U.S. Pat. No. 7,075,703;

(e) application Ser. No. 11/550,114 filed Oct. 17, 2006 (Publication No. 2007/0109219, now U.S. Pat. No. 7,839,564);

(f) application Ser. No. 11/612,732, filed Dec. 19, 2006 (Publication No. 2007/0152956, now U.S. Pat. No. 7,649,674); and (g) application Ser. No. 11/850,831, filed Sep. 6, 2007 (Publication No. 2008/0057252, now U.S. Pat. No. 7,583,427).

The entire contents of these patents and copending applications, and of all other U.S. patents and published and copending applications mentioned below, are herein incorporated by reference.

BACKGROUND OF INVENTION

This invention relates to electro-optic displays, and to materials and methods for the production and testing of such displays. This invention is particularly, but not exclusively, intended for use with displays comprising encapsulated electrophoretic media. However, the invention can also make use of various other types of electro-optic media which are solid, in the sense that they have solid external surfaces, although the media may, and often do, have internal cavities which contain a fluid (either liquid or gas). Thus, the term "solid electro-optic displays" includes encapsulated electrophoretic displays, encapsulated liquid crystal displays, and other types of displays discussed below.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in copending application Ser. No. 10/711,802, filed Oct. 6, 2004 (Publication No. 2005/0151709), that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also U.S. Patent Publication Nos. 2005/0259068, 2006/0087479, 2006/0087489, 2006/0087718, 2006/0209008, 2006/0214906, 2006/0231401, 2006/0238488, 2006/0263927 and U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,790; 7,236,792; 7,242,513; 7,247,379; 7,256,766; 7,259,744; 7,280,094; 7,304,634; 7,304,787; 7,312,784; 7,312,794; 7,312,916; 7,237,511; 7,339,715; 7,349,148; 7,352,353; 7,365,394; and 7,365,733; and U.S. Patent Applications Publication Nos. 2002/0060321; 2002/0090980; 2003/0102858; 2003/0151702; 2003/0222315; 2004/0105036; 2004/0112750; 2004/0119681; 2004/0155857; 2004/0180476; 2004/0190114; 2004/0257635; 2004/0263947; 2005/0000813; 2005/0007336; 2005/0012980; 2005/0018273; 2005/0024353; 2005/0062714; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0253777; 2005/0280626; 2006/0007527; 2006/0038772; 2006/0139308; 2006/0139310; 2006/0139311; 2006/0176267; 2006/0181492; 2006/0181504; 2006/0194619; 2006/0197737; 2006/0197738; 2006/0202949; 2006/0223282; 2006/0232531; 2006/0245038; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0109219; 2007/0128352; 2007/0146310; 2007/0152956; 2007/0153361; 2007/0200795; 2007/0200874; 2007/0201124; 2007/0207560; 2007/0211002; 2007/0211331; 2007/0223079; 2007/0247697; 2007/0285385; 2007/0286975; 2007/0286975; 2008/0013155; 2008/0013156; 2008/0023332; 2008/0024429; 2008/0024482; 2008/0030832; 2008/0043318; 2008/0048969; 2008/0048970; 2008/0054879; 2008/0057252; and 2008/0074730; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic materials may also be used in the present invention.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium tin oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982, 178, (see column 3, lines 63 to column 5, line 46) many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum. Accordingly, most prior art methods for final lamination of solid electrophoretic displays are essentially batch methods in which (typically) the electro-optic medium, a lamination adhesive and a backplane are brought together immediately prior to final assembly, and it is desirable to provide methods better adapted for mass production.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media.

The aforementioned U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate. When a very flexible front plane laminate is desired for use in a flexible display, ITO-coated polymeric films having thicknesses of about 0.5 to 1 mil (13 to 25 µm) are commercially available and can be coated with electro-optic material.

The aforementioned U.S. Pat. No. 6,982,178 also describes a first method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

The aforementioned 2007/0109219 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned 2008/0057252 describes various methods designed for high volume manufacture of electro-optic displays using inverted front plane laminates; preferred forms of these methods are "multi-up" methods designed to allow lamination of components for a plurality of electro-optic displays at one time.

The aforementioned U.S. Pat. No. 6,982,178 also describes methods for forming an electrical connection between a backplane to which the front plane laminate is laminated and the light-transmissive electrically-conductive layer within the front plane laminate. (Such a connection is necessary because the electronic circuits which control the voltages applied to the pixel electrodes also normally control the voltage applied to the front electrode.) As illustrated in FIGS. 21 and 22 of this patent, the formation of the layer of electro-optic medium within the front plane laminate may be controlled so as to leave uncoated areas ("gutters") where no electro-optic medium is present, and portions of these uncoated areas can later serve to form the necessary electrical connections. However, this method of forming connections tends to be undesirable from a manufacturing point of view, since the placement of the connections is of course a function of the backplane design, so that FPL coated with a specific arrangement of gutters can only be used with one, or a limited range of backplanes, whereas for economic reasons it is desirable to produce only one form of FPL which can be used with any backplane.

Accordingly, the aforementioned U.S. Pat. No. 6,982,178 also describes methods for forming the necessary electrical connections by coating electro-optic medium over the whole area of the FPL and then removing the electro-optic medium where it is desired to form electrical connections. However, such removal of electro-optic medium poses its own problems, especially when the FPL is formed by coating a thin (less than about 25 µm) polymeric film. Typically, the electro-optic medium must be removed by the use of solvents or mechanical cleaning, either of which may result in damage to, or removal of, the electrically-conductive layer of the FPL (this electrically-conductive layer usually being a layer of a metal oxide, for example indium tin oxide, less than 1 µm thick), causing a failed electrical connection. In extreme cases, damage may also be caused to the front substrate (typically a polymeric film) which is used to support and mechanically protect the conductive layer. In some cases, the materials from which the electro-optic medium is formed may not be easily solvated, and it may not be possible to remove them without the use of aggressive solvents and/or high mechanical pressures, either of which will exacerbate the aforementioned problems.

Similar methods using selective coating of electro-optic medium and/or selective removal of electro-optic medium may also be applied to the double release films and inverted front plane laminates discussed above.

It is common practice to use laser cutting to separate from a continuous web of FPL pieces of appropriate sizes for lamination to individual backplanes. Such laser cutting can also be used to prepare areas for electrical connections to the backplane by "kiss cutting" the FPL with the laser from the lamination adhesive side so that the lamination adhesive and electro-optic medium are removed from the connection areas, but the electrically-conductive layer is not removed. Such kiss cutting requires accurate control of both laser power and cutting speed if the thin and relatively fragile electrically-conductive layer is not to be removed or damaged. Also, depending upon the location of the connection, bending of the electrically-conductive layer and the associated front substrate may crack the conductive layer, resulting in failure to make a proper connection between the backplane and the conductive layer, and hence display failure.

The aforementioned 2007/0211331 describes methods of forming electrical connections to the conductive layers of front plane laminates. This application describes a first process for the production of a front plane laminate which comprises forming a sub-assembly comprising a layer of lamination adhesive and a layer of electro-optic medium; forming an aperture through this sub-assembly; and thereafter securing to the exposed surface of the lamination adhesive a light-transmissive electrode layer extending across the aperture. The resultant FPL has a pre-cut aperture through the electro-optic medium and adhesive layers, this pre-cut aperture allowing contact to be made with the electrode layer.

The aforementioned 2007/0211331 also describes a second process for the production of a front plane laminate which comprises forming a sub-assembly comprising a layer of lamination adhesive and a layer of electro-optic medium; and thereafter securing to the exposed surface of the lamination adhesive a light-transmissive electrode layer, the electrode layer having a tab portion which extends beyond the periphery of the lamination adhesive and electro-optic layers.

One aspect of the present invention relates to alternative methods for forming electrical connections to the conductive layers of front plane laminates which are generally similar to those described in the aforementioned 2007/0211331 but which do not require forming an aperture through the electro-optic layer or the provision of a tab portion on the electrode layer.

A second aspect of the present invention relates to reducing problems experienced in testing prior art front plane laminates and similar structures. The first testing method for a front plane laminate described in the aforementioned U.S. Pat. No. 6,982,178 obviously requires that electrical contact be made with both the light-transmissive electrically-conductive layer and the conductive layer of the release sheet. Contact with the light-transmissive electrically-conductive layer (a so-called "top plane connection") can be made as described in the aforementioned 2007/0211331 by providing a pre-cut aperture through the electro-optic medium and any adhesive layer lying between the electro-optic medium and the light-transmissive electrically-conductive layer. Contact with the conductive layer of the release sheet may be achieved by providing a section of the release sheet which extends outwardly beyond the remaining layers of the front plane laminate, with the conductive layer being exposed on the extension.

A typical prior art front plane laminate (generally designated P100) of this type is illustrated in FIGS. 1 and 2 of the accompanying drawings, in which FIG. 1 is a top plan view of the front plane laminate and FIG. 2 is a schematic section through one of the inspection tabs shown in FIG. 1. The FPL P100 has a main section P102, which is rectangular in shape and two inspection tabs each generally designated P104; each of the tabs P104 has an inner section P104A adjacent the main section P102 and an outer section P104B.

As shown in FIG. 2, the FPL P100 comprises several different layers. In order from the top (viewing) surface of the FPL, these layers are:
(a) a masking film P106, which serves to protect the underlying layers and is removed before the final display is placed in use;
(b) a layer of optically clear adhesive P108;
(c) a layer P110 of PET, which serves as a supporting and protective layer supporting;
(d) a light-transmissive electrode layer P112 formed of indium-tin-oxide (ITO);
(e) an electro-optic layer P114, illustrated as an encapsulated electrophoretic layer;
(f) a lamination adhesive layer P116;
(g) a conductive aluminum coating P118 supported on;
(h) a polymer film P120 which, together with the aluminum coating P118 forms a conductive release sheet.

All of the foregoing layers are present throughout the main section P102 and in the inner section P104A of each tab P104. However, as shown in FIG. 2, only the aluminum coating P118 and polymer film P 120 are present in the outer section P104B of each tab P 104, so that in each outer section P104 the upper surface (as illustrated in FIG. 2) of the aluminum coating is exposed to enable electrical contact to be made with this coating. To enable contact to be made with the ITO layer P112, each inner tab section P104A is provided with a top plane connection aperture P122, which extends from the lower surface (as illustrated in FIG. 2) of the FPL P100 through the polymeric layer P120, the aluminum coating P118, the adhesive layer P116 and the electro-optic layer P114. A printed silver layer P124 covers the section of the ITO layer P112 exposed by the aperture P122, this silver layer P124 serving to lessen the risk of damage to the relatively fragile ITO layer P112 when a probe is used to make electrical contact with the ITO layer P112. (The silver layer P124 is produced by printing silver ink on to the ITO layer P112 supported on the PET layer P110 prior to coating the electro-optic layer P114 over the ITO layer 112.)

By contacting the exposed surfaces of the aluminum coating P118 and the silver layer P124 with probes, the FPL P100, which is of a size corresponding to a single display, can be tested by the first testing method described in the aforementioned U.S. Pat. No. 6,982,178. Subsequent removal of the release sheet comprising the polymeric layer P120 and the aluminum coating P118 removes the outer tab section P104B, leaving the inner tab sections 104A and their apertures P122 available to act as top plane connections in the final display.

The prior art FPL structure shown in FIGS. 1 and 2 gives good results with relatively thick FPL's, for example those described in the aforementioned U.S. Pat. No. 6,982,178 which are based upon a PET layer P110 having a thickness of about 5 mil (127 µm). However, when the prior art FPL structure shown in FIGS. 1 and 2 is based upon a PET layer having a thickness of about 1 mil (25 µm), there is a risk of mechanical damage to the aperture P122 or the adjacent parts of the silver layer P124 and ITO layer P112, and since in this structure the apertures P122 are used both for testing purposes and as the top plane connections in the final display, any damage to the apertures or the adjacent conductive layers during testing may affect the performance of the final display.

The structure shown in FIGS. 1 and 2 has other disadvantages. As described in the aforementioned U.S. Pat. No. 6,982,178, an FPL is typically prepared by coating the electro-optic layer on a polymeric film already coated with ITO (such ITO-coated films are available commercially); if the silver layer P124 is present this layer is coated before the electro-optic layer is applied. Separately, the adhesive layer P116 is coated on to a conductive release sheet comprising the aluminum layer P118 and the polymeric layer P120, and the resultant adhesive-on-release sub-assembly is laminated, typically under heat and pressure, to the electro-optic layer. Desirably, up to this point the process is conducted on material in the form of webs or large sheets, and only after the FPL is prepared is it cut into pieces suitable for use in forming individual displays.

If the structure shown in FIGS. 1 and 2 is prepared in this manner, it is either necessary to cut the electro-optic layer-on-PET and adhesive-on-release sheets separately before they are laminated together and then to laminate them keeping careful alignment to ensure that the aluminum layer remains exposed on the small outer tab sections P104B, or it is necessary to cut a piece of laminated FPL to the shape shown in FIG. 1, and then to remove the layers P106-P116 from the outer tab sections P104B. In either case, it is also necessary to form the apertures P122. In practice, the laminated FPL is cut to the shape shown in FIG. 1, and laser "kiss" cutting is applied from both sides of the FPL both to remove the unwanted layers from the outer tab sections P104B and to form the apertures 122. Such laser cutting may damage the silver layer P124 and/or the adjacent part of the ITO layer P112, with the disadvantageous results already noted.

Moreover, the structure shown in FIGS. 1 and 2 requires that the same top plane connections (apertures P122) be used for both testing and in the final display, whereas for engineering reasons it may be more convenient to provide separate sets of top plane connections for the two purposes, and leaves the inner tab sections P104A remaining on the final FPL after the conductive release sheet P118/P120 has been removed, and in some cases the presence of these protruding inner tab sections P104A may be inconvenient.

The second aspect of the present invention seeks to provide a front plane laminate, or similar article of manufacture, which reduces or eliminates the disadvantages of the prior art structure discussed above.

SUMMARY OF INVENTION

Accordingly, in one aspect this invention provides a process for the production of an article of manufacture useful in the production of an electro-optic display, the process comprising:

providing an electro-optic sub-assembly comprising a layer of electro-optic medium;

providing an adhesive sub-assembly comprising an adhesive layer, the adhesive layer being larger in at least one dimension than the layer of electro-optic medium, the adhesive layer having at least one aperture extending therethrough; and adhering the adhesive sub-assembly to the electro-optic sub-assembly so that a part of the adhesive layer adheres to the layer of electro-optic medium but the at least one aperture in the adhesive layer is spaced from the layer of electro-optic medium (i.e., so that the electro-optic medium does not block the adjacent ends of the aperture(s) in the adhesive layer).

In such a "pre-formed aperture" process, the electro-optic sub-assembly may comprise a light-transmissive electrically-conductive layer which will form a front electrode in the final display. Also, in such a case, the electro-optic sub-assembly will typically also comprise at least one supporting or protective layer on the opposed side of the electrically-conductive layer from the layer of electro-optic medium, the supporting or protective layer serving to support the electrically-conductive layer and to protect it against mechanical damage. The supporting or protective layer may also serve other functions, for example by acting as a barrier against water vapor and/or ultra-violet radiation, and/or providing a desired surface texture. (The electro-optic medium is of course normally viewed from the side carrying the electrically-conductive layer.) Alternatively, the electro-optic sub-assembly may comprise a second adhesive layer disposed on one surface of the layer of electro-optic medium; the adhesive sub-assembly is adhered to the surface of the layer of electro-optic medium not covered by the second adhesive layer. The surface of the second adhesive layer remote from the layer of electro-optic medium may be covered by a release sheet. The electro-optic sub-assembly may also comprise a release sheet covering the surface of the layer of electro-optic medium to be adhered to the adhesive sub-assembly, this release sheet being removed from the layer of electro-optic medium before the layer of electro-optic medium is contacted with the adhesive sub-assembly.

The adhesive sub-assembly will typically comprise a release sheet carrying the adhesive layer. It is not necessary that the at least one aperture in the adhesive layer extend through the release sheet, but typically the at least one aperture will do so, since it is usually most convenient to form the at least one aperture by cutting (for example, by laser or die cutting) completely through the adhesive sub-assembly.

The electro-optic medium used in the process of the present invention may be any solid electro-optic medium of the types previously described. Thus, the electro-optic medium may be a rotating bichromal member or electrochromic medium. The electro-optic medium may also be an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrophoretic material may be of the polymer-dispersed type, with the electrically charged particles and the fluid present as a plurality of discrete droplets surrounded by a continuous phase comprising a polymeric material. The fluid used may be liquid or gaseous.

This invention extends to the novel sub-assemblies and displays produced by the process of the present invention. Articles of manufacture and electro-optic displays produced using the process of the present invention can be used in any of the applications in which electro-optic displays have previously been used. Accordingly, this invention extends to an electronic book reader, portable computer, tablet computer, cellular telephone, smart card, sign, watch, shelf label or flash drive comprising a display of the present invention, or produced using a method or component of the present invention.

This invention also provides a sub-assembly useful in the production of an electro-optic display, the sub-assembly comprising:

a layer of electro-optic medium; and an adhesive layer larger in at least one dimension than the layer of electro-optic medium, the adhesive layer having at least one aperture extending therethrough;

a part of the adhesive layer adhering to the layer of electro-optic medium but the at least one aperture in the adhesive layer being spaced from the layer of electro-optic medium.

In such a sub-assembly, a plurality of discrete areas of the layers of electro-optic medium may be disposed on a substrate, the discrete areas being separated by lands free from the electro-optic medium, and a plurality of apertures may pass through the adhesive layer, one end of each aperture terminating in one of the lands. The sub-assembly may comprise a light-transmissive electrically-conductive layer disposed on the surface of the layer of electro-optic medium remote from the adhesive layer.

The invention extends to an electro-optic display comprising the aforementioned sub-assembly and a backplane adhered to the adhesive layer, the backplane comprising at least one first electrode disposed adjacent the layer of electro-optic medium and at least one second electrode spaced from the layer of electro-optic medium, the at least one second electrode being in electrical contact with the light-transmissive electrically-conductive layer via the at least one aperture in the adhesive layer. This invention also extends to an electronic book reader, portable computer, tablet computer, cellular telephone, smart card, sign, watch, shelf label or flash drive comprising such a display.

In a second main aspect, this invention provides an article of manufacture (a "detachable tab front plane laminate" or "DTFPL") for use in the production of an electro-optic display, the article comprising a conductive layer and a layer of electro-optic medium, the conductive layer having a main section covered by the layer of electro-optic medium, an exposed section in at least part of which the conductive layer is exposed free from the electro-optic medium, and a weak section connecting the main section and the exposed section, such that the exposed section can be manipulated to cause rupture of the weak section, thereby separating the exposed section from the main section without substantial damage to the main section.

Typically, in the detachable tab front plane laminate of the present invention, all sections of the conductive layer will be supported on a supporting layer (for example, a polymeric film) and both the conductive layer and supporting layer will have weak sections to enable the exposed section of the conductive layer and the associated part of the supporting layer to be detached from the main section of the conductive layer and the associated part of the supporting layer. The supporting layer may also serve other functions, for example by acting as a barrier against water vapor and/or ultra-violet radiation, and/or providing a desired surface texture.

Although the article provided by the present invention has been referred to above as a "detachable tab front plane laminate" and will primarily be described below with reference to "full" front plane laminates similar to that shown in FIGS. 1 and 2, the present invention can be applied to other structures having an electro-optic layer and a conductive layer. For example, the aforementioned 2004/0155857 describes a double release film comprising an electro-optic layer sandwiched between two release sheets, either or both of which can include a conductive layer for testing purposes. Such a double release film can be provided with detachable tabs in accordance with the present invention. Similarly, in the type of FPL shown in FIG. 2, the conductive layer P118 of the release sheet could be omitted and a detachable tab provided for the conductive layer P112, and the FPL tested by the second method described in the aforementioned U.S. Pat. No. 6,982,178, with the static charge being applied to the polymeric layer P120.

As described above, typically a front plane laminate intended for testing will have two separate conductive layers, one conductive layer (P112 in FIG. 2) being that which will form the front electrode in the final display, and the other conductive layer (P118 in FIG. 2) being part of a conductive release sheet which will be removed from the front plane laminate before lamination to a backplane. Desirably, in such a dual conductive layer front plane laminate, a detachable exposed section is provided for each conductive layer. In order to facilitate removal of the two separate detachable exposed sections, they are desirably offset from one another, i.e., spaced from one another in the plane of the layer of electro-optic medium. The exposed section of the front electrode conductive layer may be provided as illustrated in the same way as in FIG. 2, that is to say by providing an aperture extending through layers of the front plane laminate (and the conductive release sheet, if the conductive release sheet covers the location of the aperture) overlying the front electrode conductive layer. As in FIG. 2, the portion of the front electrode conductive layer exposed by the aperture may be strengthened by providing a conductive pad in electrical contact with the conductive layer. Although the exposed sections of the two conductive layers could reside on the same detachable tab, it will typically be convenient to provide two separate detachable tabs for the exposed sections of the two conductive layers. As discussed in more detail below, providing separate tabs has the advantage that, at least in some cases, the exposed section of the conductive layer on the release sheet can be provided simply by weakening the appropriate area of the FPL and then removing from the relevant tab the front substrate, with the electro-optic medium and adhesive attached thereto.

The weak section or sections of the DTFPL may have various forms, although it is of course necessary to preserve some electrical connection between the exposed and main sections of the conductive layer to ensure that the electro-optic medium can still be switched during the testing process. For example, in the type of FPL shown in FIG. 2 the thicknesses of the PET layer P110 and the polymeric layer P120 could be reduced, such as by contacting these layers with heated members. However, it is generally preferred that parts of the weak section be cut, for example by perforating or rouletting; the latter may be preferred since it does not generate numerous small pieces of debris.

The electro-optic medium used in the DTFPL of the present invention may be any solid electro-optic medium of the types previously described. Thus, the electro-optic medium may be a rotating bichromal member or electrochromic medium. The electro-optic medium may also be an electrophoretic material comprising a plurality of electrically charged particles disposed in a fluid and capable of moving through the fluid under the influence of an electric field. The electrically charged particles and the fluid may be confined within a plurality of capsules or microcells. Alternatively, the electrophoretic material may be of the polymer-dispersed type, with the electrically charged particles and the fluid present as a plurality of discrete droplets surrounded by a continuous phase comprising a polymeric material. The fluid used may be liquid or gaseous.

Electro-optic displays produced using the DTFPL of the present invention can be used in any of the applications in which electro-optic displays have previously been used. Accordingly, this invention extends an electronic book reader, portable computer, tablet computer, cellular telephone, smart card, sign, watch, shelf label or flash drive comprising a display produced using an article of the present invention.

Finally, this invention provides a process for testing a layer of electro-optic medium, the process comprising:
providing an article comprising a conductive layer and a layer of electro-optic medium, the conductive layer having a main section covered by the layer of electro-optic medium, an exposed section in at least part of which the conductive layer is exposed free from the electro-optic medium, and a weak section connecting the main section and the exposed section;
applying a potential to the conductive layer sufficient to change the optical state of the layer of electro-optic medium;
observing the appearance of the layer of electro-optic medium following the change; and
thereafter, manipulating the exposed section to cause rupture of the weak section, thereby separating the exposed section from the main section without substantial damage to the main section.

In such a process, the article (DTFPL) may comprise first and second conductive layers disposed on opposed sides of the layer of electro-optic medium, each of the first and second conductive layers being provided with an exposed section and a weak section, the potential is applied between the first and second conductive layers, and thereafter both exposed sections are manipulated to cause rupture of both weak sections.

The accompanying drawings are not strictly to scale. In particular, for ease of illustration, the thicknesses of the various layers are greatly exaggerated relative to their lateral dimensions. The present invention is well adapted for the production of thin, flexible electro-optic displays; typically, the sub-assemblies used in the processes described below will have thicknesses of about 100 μm, and can be laminated to flexible backplanes of similar thickness.

BRIEF DESCRIPTION OF DRAWINGS

As already mentioned, FIG. 1 of the accompanying drawings is a top plan view of a prior art front plane laminate having inspection tabs.

DETAILED DESCRIPTION

Figure 1:
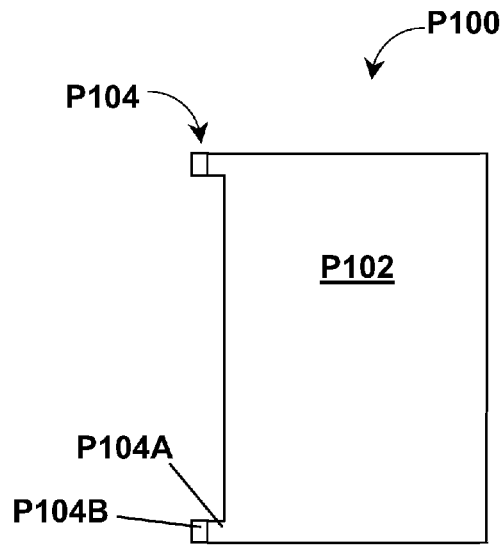

Before describing in detail various embodiments of the present invention it is useful to set out certain definitions. The term "backplane" is used herein consistent with its conventional meaning in the art of electro-optic displays and in the aforementioned patents and published applications, to mean a rigid or flexible material provided with one or more electrodes. The backplane may also be provided with electronics for addressing the display, or such electronics may be provided in a unit separate from the backplane. In flexible displays (and the present invention is especially although not exclusively intended for use in flexible displays), it is highly desirable that the backplane provide sufficient barrier properties to prevent ingress of moisture and other contaminants through the non-viewing side of the display. If one or more additional layers need to be added to the backplane to reduce ingress of moisture and other contaminants, the barrier layers should be located as closely as possible to the electro-optic layer so that little or no edge profile of low barrier materials is present between the front (discussed below) and rear barrier layers.

Reference will be made hereinafter to "loose" and "tight" release sheets. These terms are used in their conventional meaning in the art to indicate the magnitude of the force necessary to peel the relevant release sheet from the layer with which it is in contact, a tight release sheet requiring more force than a loose release sheet. In particular, if a stack of layers has a tight release sheet on one side and a loose release sheet on the other, it is possible to peel the loose release sheet away from the stack without separating the tight release sheet from the stack.

Some of the displays and sub-assemblies of the present invention contain two separate adhesive layers. When necessary or desirable, the two adhesive layers will be denoted as "front" and "rear" adhesive layers, these terms denoting the position of the relevant adhesive layer in the final display; the front adhesive layer is the adhesive layer lying between the electro-optic medium and the viewing surface of the display, while the rear adhesive layer lies on the opposed side of the electro-optic layer from the front adhesive layer. In the common situation where a display has a single front electrode between the electro-optic layer and the viewing surface and a plurality of pixel electrodes on the opposed side of the electro-optic layer, the front adhesive layer lies between the electro-optic layer and the front electrode, while the rear adhesive layer lies between the electro-optic layer and the pixel electrodes.

As indicated above, in one aspect the present invention provides a "pre-formed aperture" process for the production of a sub-assembly useful in the manufacture of an electro-optic display. In this pre-formed aperture process, separate electro-optic and adhesive sub-assemblies are formed, the former comprising at least a layer of electro-optic medium and the later at least an adhesive layer. The adhesive layer has one or more apertures extending therethrough. The two sub-assemblies are adhered together so that a part of the adhesive layer adheres to the layer of electro-optic medium, but the electro-optic medium does not block the aperture(s) in the adhesive layer.

As already indicated, the electro-optic sub-assembly used in this process may comprise at least one electrode layer, most commonly a single continuous front electrode extending across the entire display. Typically, the surface of the electro-optic sub-assembly remote from the adhesive sub-assembly will form the viewing surface through which an observer views the display. As with the backplane, the electro-optic sub-assembly may provide barrier properties to preventingress of moisture and other contaminants through the viewing side of the display. If one or more additional layers need to be added to the sub-assembly to reduce ingress of moisture and other contaminants, the barrier layers should be located as closely as possible to the electro-optic layer so that little or no edge profile of low barrier materials is present between the front and rear barrier layers. For more detailed discussion of such barrier layers, and other optional layers in the two sub-assemblies, see the aforementioned 2007/0109219 and 2007/0152956.

FIGS. 3A to 3E are schematic sections through various stages in a pre-formed aperture process of the present invention. In the first step of the process, an electro-optic medium is coated or otherwise deposited on to a tight release sheet 302 to form an electro-optic layer 304. Separately, a front adhesive layer 306 is coated on to a loose release sheet 308. The two resulting sub-assemblies are then laminated to each other with the adhesive layer 306 in contact with the electro-optic layer 304 to produce the structure shown in FIG. 3A. These steps are as described in the aforementioned U.S. Pat. No. 7,110,164, and the resulting assembly is a double release sheet as described in the aforementioned 2004/0155857.

Figure 3A:
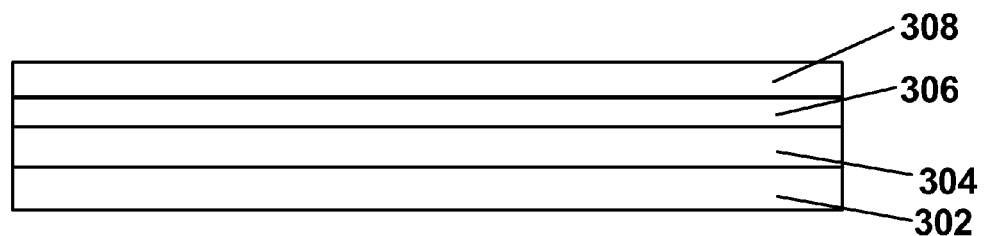
FIGS. 3A to 3E are schematic sections through various stages in a pre-formed aperture process of the present invention.

In the second step of the process, the structure shown in FIG. 3A is kiss cut with the loose release 308 facing the cutter (typically a laser cutter), the kiss cutting being effected such that the loose release sheet 308, the front adhesive layer 306 and the electro-optic layer 304 are severed but the tight release sheet 302 is not. The continuous portions of the loose release sheet 308, the front adhesive layer 306 and the electro-optic layer 304 are then removed, either manually or mechanically, thus leaving the structure shown in FIG. 3B, in which there extend upwardly from the tight release sheet 302 multiple "mesas" comprising the islands 318 of the loose release sheet and similarly sized areas 316 and 314 of the front adhesive layer and electro-optic layer respectively. Each of these mesas will eventually form a separate display. (In some cases, it may be possible to recycle the portions of the front adhesive layer and electro-optic layer removed with the loose release sheet 308 in other small displays.)

Figure 3B:
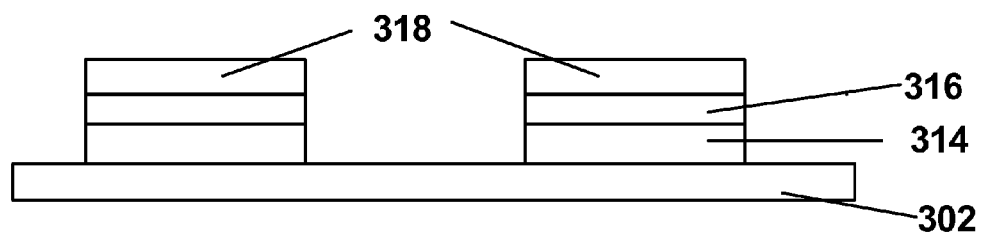

The stages of the process described thus far will typically be carried out either on continuous webs of material, or on large sheets of material sufficient to form several final displays. For ease of illustration, FIG. 3B shows only two separate mesas but it will be appreciated that in practice a larger number of mesas will be present on a single large sheet or web. When the process is carried on a web, on a roll-to-roll basis, the webs used may include tractor feed holes formed along the side edges of the web of material to serve as alignment holes. Alternatively, fiducial marks could be provided on the web and these fiducial marks sensed optically to control the alignment of the webs.

In the next step, the remaining portions 318 of the loose release sheet are peeled from the structure shown in FIG. 3B and the remaining layers of the structure are laminated to a sheet of a front substrate 320. The front substrate 320 is a multi-layer structure including an indium-tin-oxide (ITO) layer which forms the front electrode of the final display. The front substrate may further comprise a removable masking film, which can be removed before the final display is placed in use.

Figure 3C:
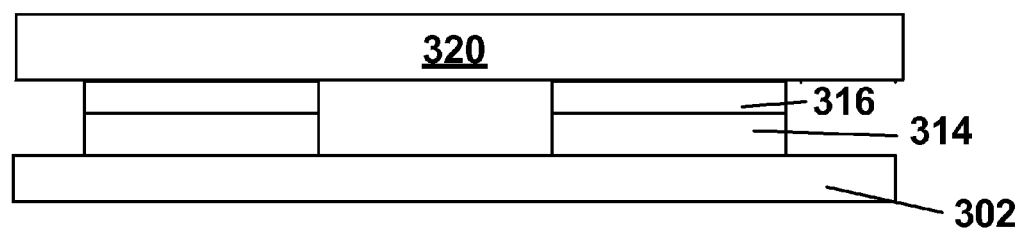
Figure 3D:
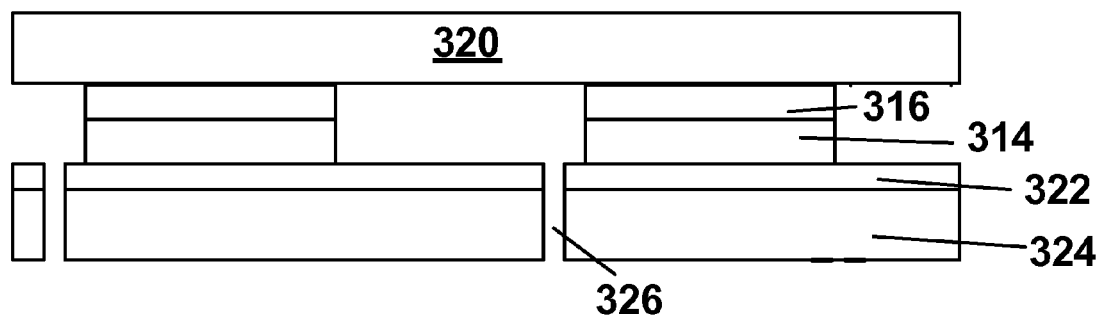

The front substrate is designed to provide the front light-transmissive electrode for the final display. The front substrate 320 can also provide the necessary mechanical support for this thin and relatively fragile front electrode. In addition, the front substrate preferably provides all necessary water vapor and oxygen barriers, and ultra-violet absorption properties, desirable to protect certain electro-optic layers, especially electrophoretic layers. The front substrate may also provide desirable anti-glare properties to the viewing surface of the final display. The front substrate 320 serves all of these functions while still being thin and flexible enough to enable the formation of a final display sufficiently flexible to be wound around a mandrel of (say) 15 mm diameter. As already noted, the front substrate includes a masking film; this masking film is provided primarily to increase the thickness of the front substrate so as to facilitate handling of this substrate during laminations. In a preferred process, the total thickness of the front substrate as it remains in the final display (i.e., with the masking film removed) is only about 1 mil (25 μm) and the masking film is used to add about 2 mil (51 μm) to this thickness for ease of handling. The masking film also typically serves to prevent scratching or adhesion of dust or debris to an adjacent anti-glare layer during the laminations. The structure resulting from this step of the process is shown in FIG. 3C, and comprises an electro-optic sub-assembly suitable for use in the process of the present invention.

The steps of the process described so far as essentially identical to those of the process described with reference to FIGS. 2A to 2E of the aforementioned 2008/0057252, to which the reader is referred for further information.

Figure 4A:
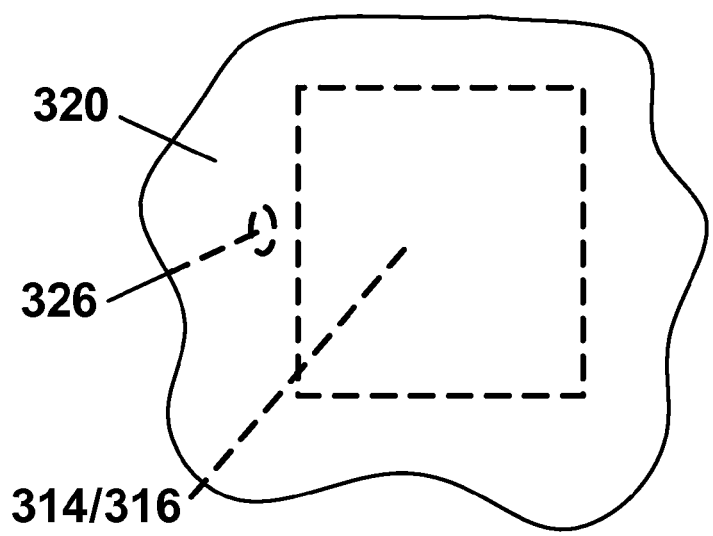
FIG. 4A is a schematic top plan view of the stage of the pre-formed aperture process shown in FIG. 3C.

At this point, a second, thin adhesive layer 322 is coated on to a third release sheet 324, and apertures 326 are formed though both the adhesive layer 322 and the release sheet 324 at positions corresponding to where top plane connections (connections between the backplanes and the front electrodes) will be present in the final displays, thereby producing an adhesive sub-assembly suitable for use in the process of the present invention. To carry out the present process, the release sheet 302 is peeled from the electro-optic sub-assembly shown in FIG. 3C and the adhesive layer 322 laminated to the electro-optic layer portions 314 to give the structure shown in FIG. 3D. Note that the apertures 326 in the adhesive layer are positioned so that they are spaced from the mesas (i.e., from the electro-optic portions 314) so that the mesas do not block the apertures 326. FIG. 4A shows a top plan view corresponding to FIG. 3D but only illustrating a single mesa and its associated aperture 326; at this stage of the process, the material is still in web or large sheet form and FIG. 4A illustrates only part of the web or sheet, as indicated by the curved boundary of front substrate 320 in FIG. 4A. (For ease of illustration, FIG. 4A shows only a single aperture 326 associated with the mesa. In practice, it is usually desirable to provide two or more apertures 326 associated with each mesa so as to provide redundant top plane connections in each final display, thereby ensuring that each display will still function correctly even if one of its top plane connections is not correctly formed or becomes damaged during use.)

Figure 3E:
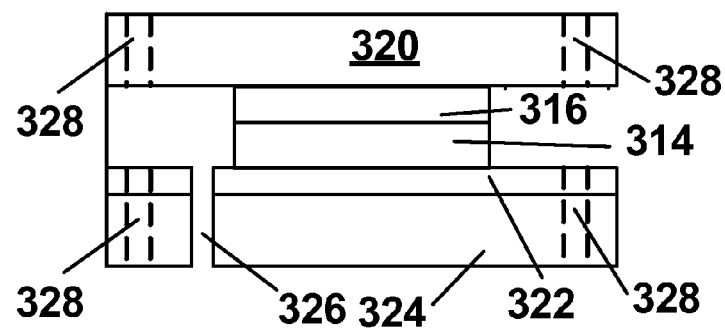
Figure 4B:
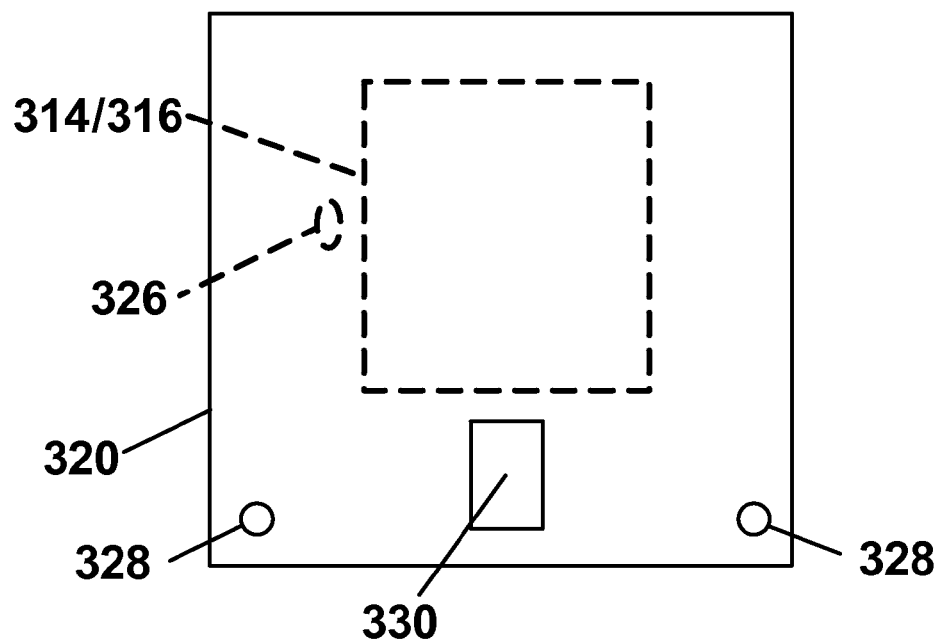
FIG. 4B is a schematic top plan view of the stage of the pre-formed aperture process shown in FIG. 3E.

The next stage of the process is singulation, that is to say separation of the portions of the sub-assembly corresponding to individual displays. The result of this singulation step is illustrated in FIGS. 3E and 4B. The singulation step simultaneously effects three logically separate operations, namely:

(a) cutting of the sheet or web into pieces of the size required for individual displays;

(b) formation of apertures through the adhesive layer 322 required for mechanical alignment of the sub-assembly during subsequent lamination to a backplane; and (c) formation of an aperture through the front substrate 320, the adhesive layers 322 and the release sheet 324, this aperture being ultimately used to mount an electronic circuit device on the backplane of the final display.

(For further discussion regarding operations (b) and (c), the reader is referred to copending application Ser. No. 60/947,039, filed Jun. 29, 2007.)

As illustrated in FIGS. 3E and 4B, operation (a) is effected by cutting the front substrate 320, the adhesive layer 322 and the release sheet 324 along the same rectangular perimeter, thus defining a separate unit (piece) of front plane laminate which will eventually be laminated to a backplane to form a single display. In addition to the singulation of the separate unit of front plane laminate, this step creates an extended tab or "tail" of non-optically active material (the portion of the front plane laminate lying below the electro-optic layer 314 as illustrated in FIG. 4B) that adds to the thickness of the corresponding section of the final display. Were this tail of non-optically active material not present, the thickness of the final display in this region would be only the thickness of the backplane itself, and in thin, flexible displays, the thickness of this backplane may be only about 25 µm; the extended tail section will typically provide an additional 25 µm of thickness, thus doubling the thickness of this region to about 50 µm. See the aforementioned 2007/0211331 for further discussion of providing a tab or tail portion of a front electrode layer, and use of such a tab or tail portion to provide electrical contact with the front electrode layer.

Operation (b) is effected by providing two small circular apertures 328 adjacent one edge (the lower edge as illustrated in FIG. 4B) of the rectangular front plane laminate. (For ease of comprehension, the apertures 328 are shown in broken lines in FIG. 3E even though FIG. 3E is a section looking upwardly in FIG. 4B so the apertures 328 would not actually be visible in the section of FIG. 3E.) As shown in FIG. 3E, the apertures 328 lie within the tail section of the FPL and extend through the whole thickness of the FPL, passing through the front substrate 320, the adhesive layer 322 and the release sheet 324. The apertures 328 can be used for mechanical alignment or attachment of the FPL during lamination to a backplane or during later stages of manufacture. As described below with reference to FIGS. 5A to 5C, the apertures 328 can used to engage registration pins or similar co-operating members provided on the backplane, or on a substrate carrying the backplane, to ensure accurate registration of the FPL with respect to the backplane. The apertures 328 can also be used in later stages of the manufacturing process to locate the final display module accurately with respect to a housing or other surrounding portion (for example, a printed circuit board) of the final commercial display unit, or to attach the display module to such housing or surrounding portion.

Operation (c) is effected by providing a rectangular aperture 330 in the tail portion of the FPL, this rectangular aperture 330 extending completely through the FPL, i.e., through the front substrate 320, the adhesive layer 322 and the release sheet 324. As discussed below, the type of FPL shown in FIGS. 3E and 4B is typically used with a backplane which is essentially the same size as the FPL, so that the FPL covers essentially the whole of the backplane. Accordingly, if it is desired to have electrical access to the backplane, for example for mounting driver chips on the backplane, an aperture must be formed to permit this, and this is the function of the aperture 330. Driver chips or other electronic circuit devices can be placed within the aperture 330, and the FPL surrounding the aperture provides a region of increased thickness which assists ruggedization of the display.

Figure 5A:
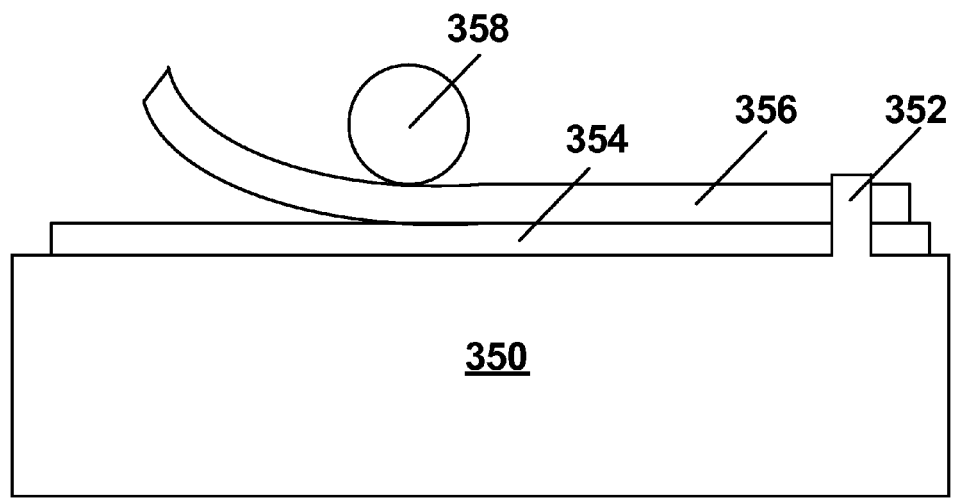
FIGS. 5A to 5C are schematic sections through various stages in the process used to convert the product of the process of FIGS. 3A to 3E to a finished display.

FIG. 5A illustrates, in a highly schematic manner, a process in which the piece of front plane laminate shown in FIGS. 3E and 4B is laminated to a backplane. As shown in FIG. 5A, a support table 350 is provided with a pair of pins 352 (only one of which is visible in FIG. 5A). A backplane 354 is provided with apertures which engage the pins 352. The release sheet 324 (see FIG. 3E) is removed from the front plane laminate 356, which is then laid over the backplane with the apertures 328 (see FIGS. 3E and 4B) engaged with the pins 352. A roller 358 passes over the front plane laminate 356, thus adhering the adhesive layer 322 (see FIG. 3E) to the adjacent surface of the backplane 354 and thus laminating the front plane laminate to the backplane to form a display. As described in the aforementioned U.S. Pat. No. 6,982,178, a conductive ink may be placed on the backplane at appropriate points prior to this lamination so that during the lamination the conductive ink is forced into the apertures 326 to form conductive vias (not shown) connecting contact pads (also not shown) on the backplane to the electrode layer in the front substrate 320. Alternatively, especially if the adhesive layer 322 and the front substrate 320 are thin, the lamination will cause the electrode layer in the front substrate 320 into electrical contact with one or more contact pads on the backplane without need for such conductive ink. Following this lamination, the laminated FPL and backplane are removed from the support table 350 as the structure shown in FIG. 5B. (The meaning of the arrows in FIG. 5B is explained below.)

When laminating front plane laminates to a backplane, the FPL must typically be aligned with respect to backplane features, for example contact pads designed to provide contacts to the electrode layer present in the front plane laminate. Depending on the design requirements, the FPL can be designed to be smaller than the backplane (to allow access to electrical connections on areas of the backplane not covered by the FPL) or the same size as the backplane. If the FPL, or a barrier layer laminated over the FPL, is the same size as the backplane, achieving a clean edge alignment can be difficult in practice, since there is always some tendency for the FPL not to line up exactly with the backplane. Also, certain features desirable during manufacture, such as inspection tabs or tacking strips, can be undesirable if present in the finished display module.

There is an increasing tendency to use electro-optic media with thin backplanes based on polymeric films (for example, PET or poly(ethylene naphthalate), PEN, available commercially under the Registered Trade Mark TEONEX from DuPont Teijin Films of Hopewell Va.) or metal foils. Electro-optic displays based on such thin backplanes can be flexible or rollable and hence usable in certain applications (for example, a large display screen capable of being stored in a cellular telephone—see the aforementioned 2002/0090980) where traditional displays cannot be used. It has now been found that an FPL laminated to such a polymeric or metal foil backplane can readily be cut by industrial methods, for example laser cutting or die cutting, and that such cutting of an FPL/backplane laminate enables an accurately matched edge to be achieved between the FPL (or a barrier layer overlying the FPL) and the backplane, without adverse effects on the functionality of the final display. Such cutting also allows for the removal of features useful during manufacture but not wanted in the final display.

Figure 5B:
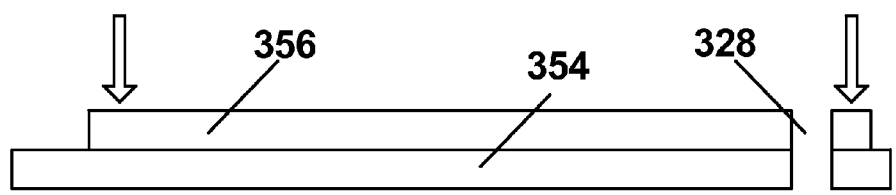
Figure 5C:
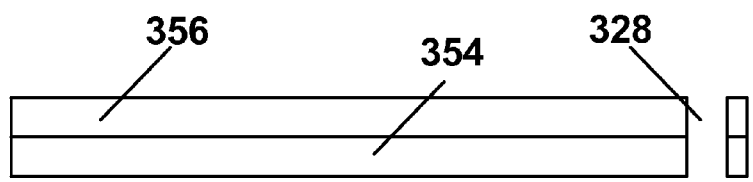

The laminate produced in FIG. 5B is then trimmed by laser or die cutting, as indicated schematically by the arrows in FIG. 5B to produce the final display module, illustrated schematically in FIG. 5C.

As mentioned above, the second main aspect of the present invention relates to a detachable tab front plane laminate comprising a conductive layer and a layer of electro-optic medium, the conductive layer having a main section covered by the layer of electro-optic medium, an exposed section in at least part of which the conductive layer is exposed free from the electro-optic medium, and a weak section connecting the main section and the exposed section, such that the exposed section can be separated from the main section without substantial damage to the main section.

Typically, the surface of the DTFPL of the present invention which remains exposed after lamination to a backplane will form the viewing surface through which an observer views the display. As with the backplane, a front substrate of the DTFPL may provide barrier properties to prevent ingress of moisture and other contaminants through the viewing side of the display. If one or more additional layers need to be added to the DTFPL to reduce ingress of moisture and other contaminants, the barrier layers should be located as closely as possible to the electro-optic layer so that little or no edge profile of low barrier materials is present between the front and rear barrier layers.

Figure 6A:
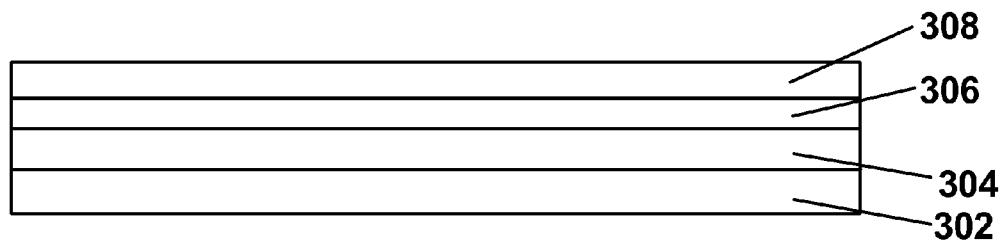
FIGS. 6A to 6E are schematic sections, similar to those of FIGS. 3A to 3E respectively through various stages in a process for the production of a detachable tab front plane laminate of the present invention.
Figure 6B:
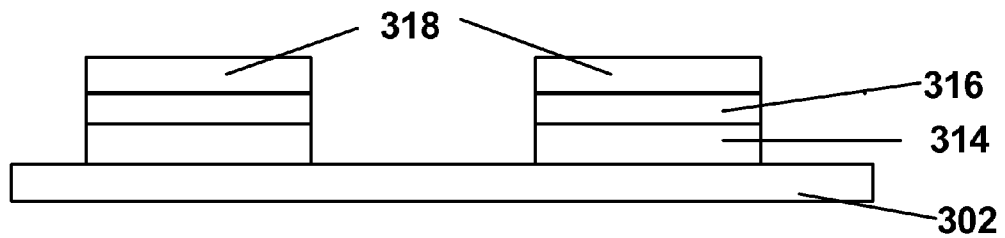
Figure 6C:
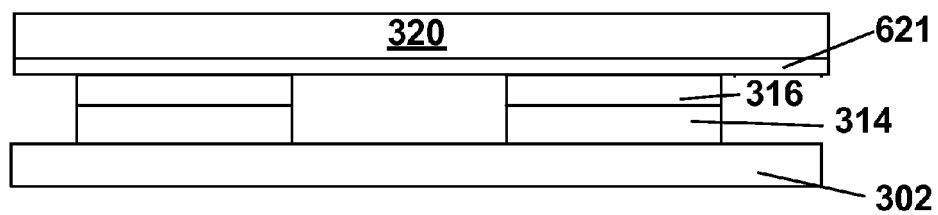

FIGS. 6A to 6E are schematic sections through various stages in the production of a DTFPL of the present invention. The process illustrated in FIGS. 6A to 6E closely resembles that illustrated in FIGS. 3A to 3E above, and accordingly the following description will be abbreviated to describe only the aspects of the process of FIGS. 6A to 6E which differ from the corresponding aspects of the process of FIGS. 3A to 3E. The first two stages of the process, illustrated in FIGS. 6A and 6B are identical to the corresponding stages shown in FIGS. 3A and 3B respectively. The next stage, shown in FIG. 6C, is also in practice identical to that shown in FIG. 3C, but for reasons which will appear below, the front electrode layer 621, which will form the light-transmissive electrode in the final display, is shown separately in FIG. 6C.

Figure 6D:
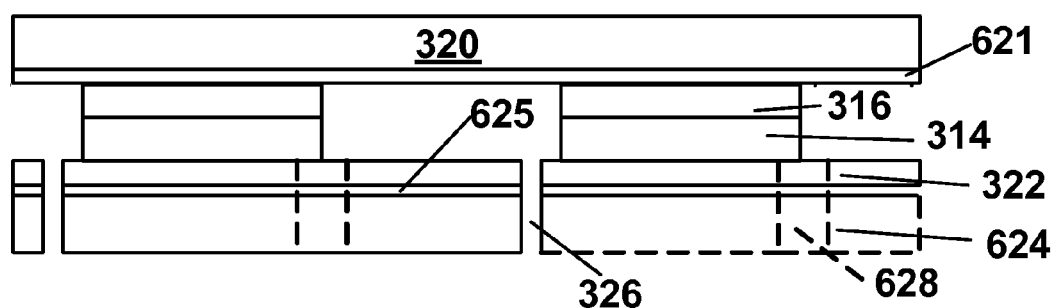
Figure 6E:
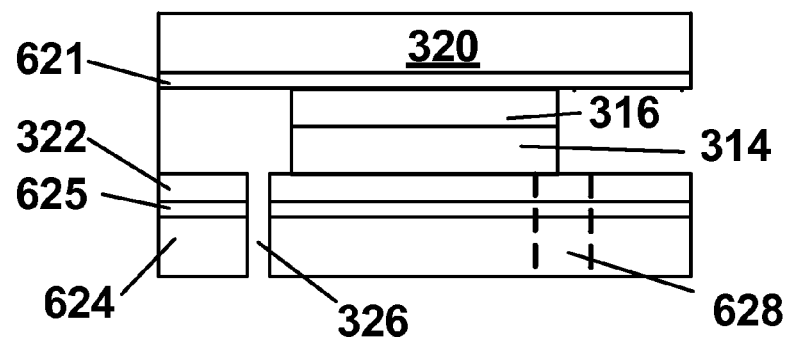
Figure 7A:
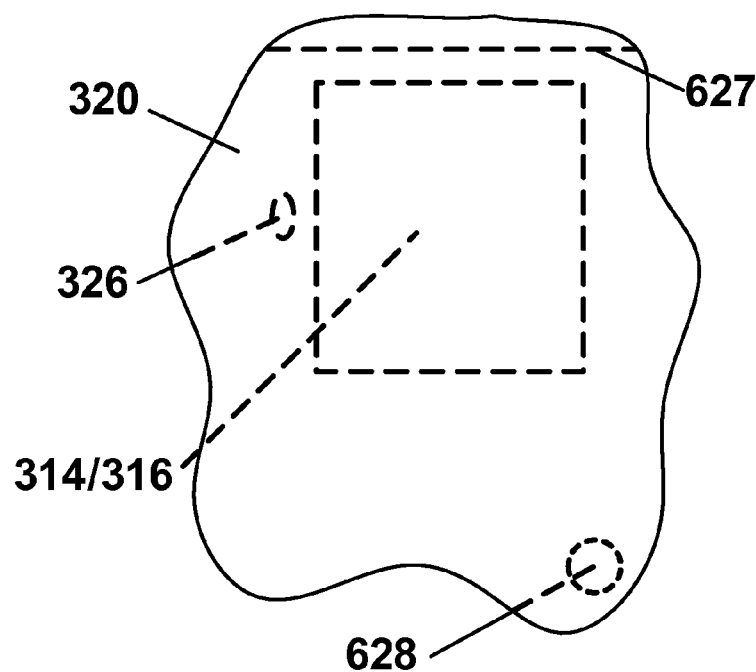
FIGS. 7A and 7B are schematic top plan views of the stages of the process corresponding to FIGS. 6C and 6E respectively.

The next step of the process uses a third release sheet 624, one surface of which bears a conductive layer 625. As in the process illustrated in FIG. 3D, a thin adhesive layer 322 is coated on the third release sheet, but in this case the adhesive layer is deposited on the conductive layer 625. Apertures 326 are formed through the adhesive layer 322, the conductive layer 625 and the release sheet 624 at positions corresponding to where top plane connections will be present in the final displays. A second aperture 628 is also formed through the adhesive layer 322, the conductive layer 625 and the release sheet 624 to allow the formation of a detachable inspection tab, as described below. At the same time, the release sheet 624 is cut, preferably discontinuously, along a line 627 (see FIG. 7A) to form a tacking strip (discussed further below). The release sheet 302 is peeled from the structure shown in FIG. 6C and the adhesive layer 322 laminated to the electro-optic layer portions 314 to give the structure shown in FIG. 6D. FIG. 7A shows a corresponding top plan view which only illustrates a single mesa and its associated apertures 326 and 628 and the line 627; at this stage of the process, the material is still in web or large sheet form and FIG. 7A illustrates only part of the web or sheet, as indicated by the curved boundary of front substrate 320 in FIG. 7A. (For ease of comprehension, the apertures 628 are shown in broken lines in FIGS. 6D and 6E even though FIGS. 6D and 6E are sections looking upwardly in FIG. 7A so the apertures 628 would not actually be visible in the sections of FIGS. 6D and 6E.) The adhesive layer 322 must of course be correctly aligned with respect to the mesas to ensure that the apertures 326 and 628 and the line 627 are in the proper positions relative to their associated mesa, as shown in FIG. 7A. (For ease of illustration, FIG. 7A shows only a single aperture 326 associated with the mesa. In practice, as in the structure shown in FIG. 4A, it is usually desirable to provide two or more apertures 326 associated with each mesa so as to provide redundant top plane connections in each final display, thereby ensuring that each display will still function correctly even if one of its top plane connections is not correctly formed or becomes damaged during use.)

Figure 7B:
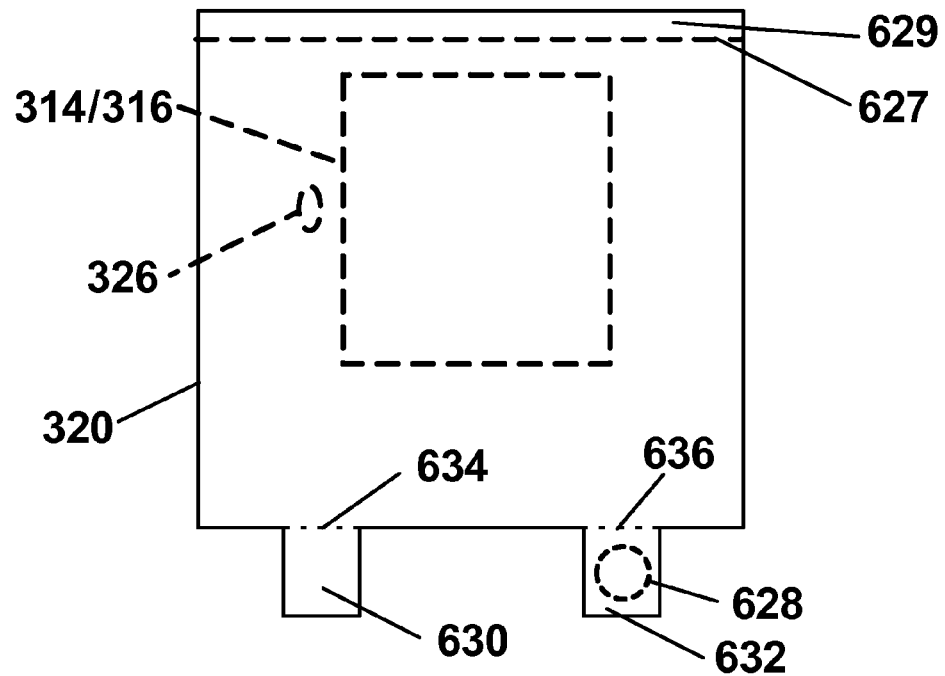

The next stage of the process is singulation, that is to say separation of the portions of the FPL corresponding to individual displays. The result of this singulation step is illustrated in FIGS. 6E and 7B. The singulation not only severs the sheet or web into FPL pieces of the size required for individual displays, but also forms detachable tabs 630 and 632 on one edge (the lower edge as illustrated in FIG. 7B) of each FPL piece. The tab 630 simply comprises a small rectangular area of the FPL separated from the main part of the FPL by a rouletted (i.e., discontinuously cut) line 634. The tab 632 surrounds the aperture 628 and is separated from the main part of the FPL by a rouletted line 636. The discontinuous cuts along lines 634 and 636 extend completely through the FPL and are formed using the same laser cutter which separates the FPL piece shown in FIGS. 6E and 7B from the web. Since the discontinuous cuts do not completely sever the conductive layers 621 and 625, the portions of these conductive layers lying within the tabs 630 and 632 are in electrical contact with the main portions of these conductive layers in the major portion of the FPL piece.

Figure 2:
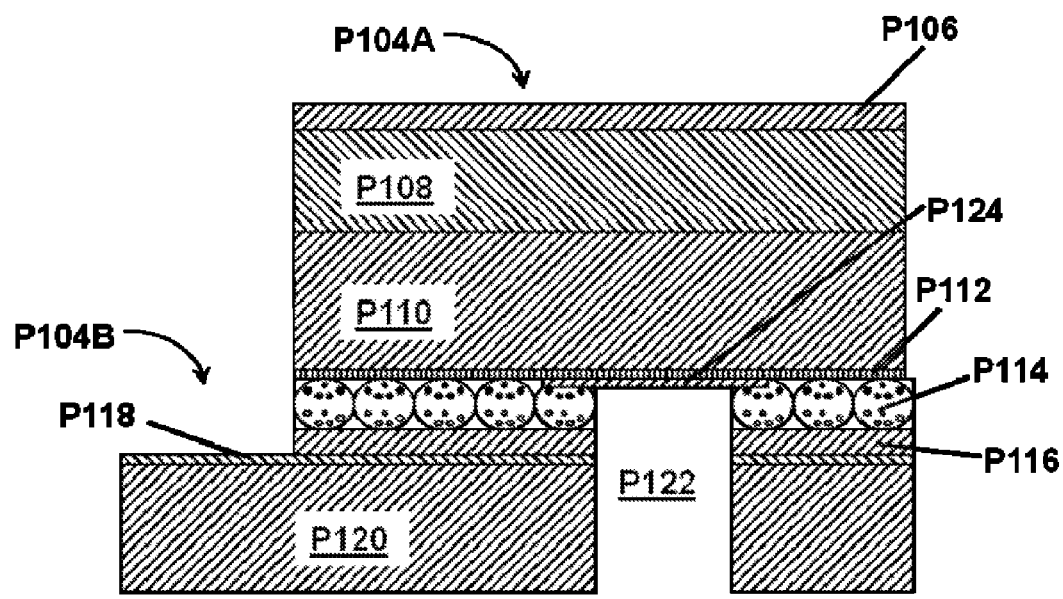
FIG. 2 is a schematic section through one of the inspection tabs of the front plane laminate shown in FIG. 1.

The tab 630 is intended to provide access to the conductive layer 625 on the release sheet 624, i.e., the tab 630 serves the same function as the outer tab sections P104B shown in FIGS. 1 and 2. Although as illustrated in FIGS. 6E and 7B, the conductive layer 625 is still covered by the front substrate 320, the front conductive layer 621 and the adhesive layer 322, it has been found that, by manually grasping the front substrate 320 and pulling, the front substrate 320, the front conductive layer 621 and the adhesive layer 322 will all part along line 634 to expose the conductive layer 625. On the tab 632, the aperture 628 exposes the front conductive layer 621, so that the tab 632 serves the same function as the inner tab sections P104A shown in FIGS. 1 and 2.

To test the FPL piece shown in FIGS. 6E and 7B, the conductive layer 625 on tab 630 is exposed as described in the preceding paragraph, and probes are placed in contact with the conductive layer 625 on tab 630 and the conductive layer 621 on tab 632. Varying voltages are applied to the conductive layers 621 and 625, thus causing the electro-optic medium to switch between its extreme optical states. The switching of the electro-optic medium is observed either by eye or by a machine vision system. Once the electro-optic medium has been found satisfactory, the probes are removed. The tabs 630 and 632 are then removed by manually pulling on them, thus causing tearing along lines 634 and 636 and separation of the tabs without damage to the main part of the FPL piece. Alternatively, the tab 630 could be used to peel the release sheet 624 from the remaining layers of the FPL prior to lamination of the FPL to a backplane.

As also illustrated in FIG. 7B, the singulation of the FPL piece from the web results in the line 627 extending close to and parallel to one edge of the FPL piece, so that between the line 627 and the adjacent edge is formed a tacking strip 629, in the form of an elongate area running along one edge of the FPL piece. Because the release sheet 624 is severed along line 627, the section of the release sheet 624 underlying the tacking strip 629 can be removed without removing the release sheet 624 from the main part of the FPL piece. The tacking strip 629 is provided to assist in locating the FPL piece on a backplane prior to the lamination of these two parts to form a display; the section of the release sheet 624 underlying the tacking strip 629 is removed and the portion of the adhesive layer 322 thus exposed can be pressed manually into the correct position for lamination to the backplane, before the main portion of the release sheet 624 is removed and the lamination operation completed.

It will be apparent to those skilled in the technology of electro-optic displays that numerous changes and modifications can be made in the preferred embodiments of the present invention already described without departing from the scope of the invention. For example, in the preferred processes of the invention illustrated in the drawings, the inverted front plane laminate is cut into pieces of the size required for an individual display (see FIGS. 3E, 4B, 6E and 7B) before being laminated to a backplane. When high volume production is desired, it may be convenient to reverse the order of these singulation and lamination operations, i.e., a sheet or web of inverted front plane laminate sufficient to form a plurality of displays could be laminated in an aligned manner to a sheet or web of backplanes to form a plurality of displays which are thereafter singulated from the sheet or web. In the case where sheets of inverted front plane laminate and backplanes are used, the sheet of backplanes will typically be held on a support member during the lamination, and the singulation operation (and any desired trimming operation, such as that described above with reference to FIGS. 5B and 5C) can be effected with the sheet of displays still held on the support member. Note that in this variant of the DTFPL process, it may only be necessary to provide a single pair of tabs 630, 632 to permit testing of the electro-optic medium of a complete sheet of FPL.

Also, in the preferred DTFPL process of the invention illustrated in FIGS. 6 and 7, the electro-optic medium does not extend into the removable tabs. In other variants of the present invention, the electro-optic medium may extend into part of the tab. For example, tabs used in DTFPL process may be similar to those illustrated in FIGS. 1 and 2 but provided with weakened sections similar to those shown in FIG. 7B so that they are detachable.

Furthermore, although the separable tabs used in the DTFPL process have been illustrated in the drawings as discrete rectangles protruding from a larger rectangular area which defines the form of the final piece of FPL, it is not necessary that the tabs protrude in this manner. Depending upon the required form of the final piece FPL, the tabs could for example have the form of triangular sections disposed within the corners of a rectangular piece of FPL, so that the final piece of FPL would have the form of a rectangle with beveled corners.

Numerous other variants of the present invention are of course possible. Accordingly, the whole of the foregoing description is to be interpreted in an illustrative and not in a limitative sense.

The invention claimed is:

1. An article of manufacture for use in the production of an electro-optic display, the article comprising a conductive layer and a layer of electro-optic medium, the conductive layer having a main section covered by the layer of electro-optic medium, an exposed section in at least part of which the conductive layer is exposed free from the electro-optic medium, and a weak section connecting the main section and the exposed section, such that the exposed section can be manipulated to cause rupture of the weak section, thereby separating the exposed section from the main section without substantial damage to the main section.

2. An article of manufacture according to claim 1 further comprising a supporting layer disposed adjacent the conductive layer, the supporting layer having a main section disposed adjacent the main section of the conductive layer, an exposed section disposed adjacent the exposed section of the conductive layer, and a weak section disposed adjacent the weak section of the conductive layer, such that the exposed section of both the conductive layer and the supporting layer can be manipulated to cause rupture of the weak sections thereof, thereby separating the exposed sections of both the conductive layer and the supporting layer from their respective main sections without substantial damage to the main sections.

3. An article of manufacture according to claim 1 comprising first and second conductive layers disposed on opposed sides of the layer of electro-optic medium, each of the first and second conductive layers being provided with an exposed section and a weak section.

4. An article of manufacture according to claim 3 wherein the exposed sections of the first and second conductive layer are spaced from one another in the plane of the layer of electro-optic medium.

5. An article of manufacture according to claim 1 wherein the weak section is formed by reducing the thickness of the conductive layer.

6. An article of manufacture according to claim 1 wherein the weak section is formed by perforating or rouletting.

7. An article of manufacture according to claim 1 wherein the electro-optic medium is a rotating bichromal member or electrochromic medium.

8. An article of manufacture according to claim 1 wherein the electro-optic medium is an electrophoretic material comprising a plurality of electrically charged particles disposed in a fluid and capable of moving through the fluid under the influence of an electric field.

9. An article of manufacture according to claim 8 wherein the electrically charged particles and the fluid are confined within a plurality of capsules or microcells.

10. An article of manufacture according to claim 8 wherein the electrophoretic material is of the polymer-dispersed type, with the electrically charged particles and the fluid present as a plurality of discrete droplets surrounded by a continuous phase comprising a polymeric material.

11. An article of manufacture according to claim 8 wherein the fluid is gaseous.

12. A process for testing a layer of electro-optic medium, the process comprising:
    providing an article comprising a conductive layer and a layer of electro-optic medium, the conductive layer having a main section covered by the layer of electro-optic medium, an exposed section in at least part of which the conductive layer is exposed free from the electro-optic medium, and a weak section connecting the main section and the exposed section;
    applying a potential to the conductive layer sufficient to change the optical state of the layer of electro-optic medium;
    observing the appearance of the layer of electro-optic medium following the change; and
    thereafter, manipulating the exposed section to cause rupture of the weak section, thereby separating the exposed section from the main section without substantial damage to the main section.

13. A process according to claim 12 wherein the article comprises first and second conductive layers disposed on opposed sides of the layer of electro-optic medium, each of the first and second conductive layers being provided with an exposed section and a weak section, the potential is applied between the first and second conductive layers, and thereafter both exposed sections are manipulated to cause rupture of both weak sections.

* * * * *